United States Patent [19]

Woodruff

[11] 4,411,921

[45] * Oct. 25, 1983

[54] METHOD FOR INHIBITING FUNGAL GROWTH ON FRESH FRUITS AND VEGETABLES

[75] Inventor: Richard E. Woodruff, Salinas, Calif.

[73] Assignee: TransFRESH Corporation, Salinas, Calif.

[ * ] Notice: The portion of the term of this patent subsequent to Jun. 24, 1997, has been disclaimed.

[21] Appl. No.: 355,327

[22] Filed: Mar. 8, 1982

Related U.S. Application Data

[63] Continuation of Ser. No. 18,934, Jun. 9, 1979, abandoned, which is a continuation of Ser. No. 784,528, Apr. 4, 1977, abandoned, which is a continuation-in-part of Ser. No. 638,619, Dec. 8, 1975, abandoned.

[51] Int. Cl.³ .............................................. A23B 7/152
[52] U.S. Cl. ..................................... 426/263; 426/270; 426/314; 426/316; 426/320; 426/335; 426/419

[58] Field of Search ............... 426/263, 270, 312, 314, 426/316, 320, 327, 335, 615, 654, 418, 419, 442, 524; 62/78; 34/36; 422/40; 99/467, 472

[56] References Cited

U.S. PATENT DOCUMENTS

| | | | |
|---|---|---|---|
| 2,490,951 | 12/1949 | Dunkley | 426/314 |
| 2,955,940 | 10/1960 | Williams | 426/314 |
| 3,453,119 | 7/1969 | McGill | 426/320 X |
| 3,930,040 | 12/1975 | Woodruff | 426/312 |
| 4,209,538 | 6/1980 | Woodruff | 426/419 X |

FOREIGN PATENT DOCUMENTS 715351  9/1954  United Kingdom ................ 426/314

Primary Examiner—Arthur L. Corbin
Attorney, Agent, or Firm—Kendrick, Netter & Bennett

[57] ABSTRACT

The growth of harmful fungi on fresh fruits and vegetables is inhibited by maintaining them in a modified atmosphere including carbon monoxide, carbon dioxide, oxygen and nitrogen.

23 Claims, No Drawings

METHOD FOR INHIBITING FUNGAL GROWTH ON FRESH FRUITS AND VEGETABLES

This is a continuation of Ser. No. 18,934, filed Mar. 9, 1979, which is a continuation of Ser. No. 784,528, filed Apr. 4, 1977, which is a continuation-in-part of U.S. patent application Ser. No. 638,619, filed Dec. 8, 1975, now all abandoned.

BACKGROUND OF THE INVENTION

1. The Field of the Invention

This invention relates generally to inhibiting the growth of fungi on fresh fruits and vegetables in refrigerated containers, whether fixed or movable, using a preservative modified gaseous environment.

2. Description of the Prior Art

In U.S. Pat. No. 2,490,951, FOOD TREATMENT PROCESS, by M. E. Dunkley, undesirable enzymic action which produces spoilage of food products is sought to be eliminated or sharply deterred by enclosing the food products in a special gaseous atmosphere of carbon monoxide and acetylene, which gaseous atmosphere is otherwise noted for its substantial lack of atmospheric oxygen (less than 0.50%). In order to maintain the specified composition of gases, and in particular the low oxygen content, the food product and special gaseous atmosphere must, according to this patent, be maintained in a sealed container.

U.S. Pat. No. 3,453,119, STORAGE OF FRESH LEAFY VEGETABLES by John W. McGill (hereinafter '119), discloses a method of treating fresh leafy vegetables in which they are maintained in an atmosphere of 1%–5% carbon monoxide, 1%–10% oxygen, not more than 5% carbon dioxide, and the remainder nitrogen. U.S. Pat. No. '119 discloses nothing about the problems fungi cause in fresh produce, and discloses no fungistatic effects of any kind.

SUMMARY AND DESCRIPTION OF THE INVENTION

This invention relates to inhibiting growth of fungi on fruits and vegetables by maintaining them under refrigerated conditions and in preservative modified atmospheres including carbon monoxide in fungistatic amounts of about 5% to about 25% by volume, oxygen in an amount less than 21% by volume, and molecular nitrogen. Some carbon dioxide may also be present for certain fruits and vegetables.

Refrigeration refers to temperatures in the range of about 29° to about 60° F., depending on the requirements of the particular fruit or vegetable. Examples of fresh fruits and vegetables are bell peppers, cauliflower, mushrooms, grapes, blueberries, tomatoes, squash, pineapples, peaches, papayas, nectarines, mangoes, melons, eggplant, cabbage, avocados, lettuce, applies, pears, apricots, cherries, potatoes, sweet potatoes, and onions.

The amounts of oxygen and carbon dioxide used vary with the kind and variety of fruit or vegetable subjected to the preservative modified atmospheres of this invention. Broadly, the carbon dioxide may be in the range of zero to about 20% by volume. The amount of oxygen is broadly in the range of about 1% to about 20% by volume.

The amount of carbon monoxide used is at least the amount sufficient to inhibit the growth of fungi on the particular fruit or vegetable. That amount will vary depending upon the nature of the fruit or vegetable, the variety of that fruit or vegetable, the length of time between harvesting of the fruit or vegetable and the application of atmospheres of this invention, and the kind of fungi involved. Broadly, carbon monoxide may constitute from about 3% to about 25% by volume, more preferably, from about 15% by volume.

The following table shows broad and more preferred ranges of carbon dioxide, oxygen and carbon monoxide for use with the kind of fruit or vegetable shown.

| FRUIT or Vegetable | Broad Ranges Percent by Volume | | | | More Preferred Ranges Percent by Volume | | | |
| --- | --- | --- | --- | --- | --- | --- | --- | --- |
| | $CO_2$ | $O_2$ | CO | $N_2$ | $CO_2$ | $O_2$ | CO | $N_2$ |
| Bell Pepper | 1–10 | 5–20 | 3–25 | BALANCE | 2–7 | 5–10 | 5–15 | BALANCE |
| Cauliflower | 1–10 | 3–20 | 3–25 | BALANCE | 3–0 | 5–10 | 5–15 | BALANCE |
| Mushroom | 3–20 | 3–20 | 3–25 | BALANCE | 5–10 | 10–15 | 10–20 | BALANCE |
| Grape | 0–15 | 2–15 | 3–25 | BALANCE | 0–10 | 5–10 | 10–20 | BALANCE |
| Blueberry | 1–15 | 2–10 | 3–25 | BALANCE | 5–10 | 3–5 | 5–15 | BALANCE |
| Tomato | 0–7 | 3–10 | 3–25 | BALANCE | 0–5 | 4–8 | 5–15 | BALANCE |
| Squash | 3–15 | 2–10 | 3–25 | BALANCE | 5–10 | 3–8 | 5–15 | BALANCE |
| Pineapple | 1–15 | 2–15 | 3–25 | BALANCE | 5–10 | 5–10 | 5–15 | BALANCE |
| Peach | 1–10 | 2–10 | 3–25 | BALANCE | 3–6 | 3–6 | 5–15 | BALANCE |
| Papaya | 2–10 | 2–10 | 3–25 | BALANCE | 4–8 | 3–8 | 5–15 | BALANCE |
| Nectarine | 1–10 | 2–10 | 3–25 | BALANCE | 3–6 | 3–6 | 5–15 | BALANCE |
| Mango | 2–10 | 2–10 | 3–25 | BALANCE | 4–8 | 4–8 | 5–15 | BALANCE |
| Melon | 2–20 | 3–15 | 3–25 | BALANCE | 10–15 | 5–10 | 5–15 | BALANCE |
| Eggplant | 0–8 | 2–10 | 3–25 | BALANCE | 0–3 | 4–8 | 5–15 | BALANCE |
| Green Beans | 2–10 | 2–10 | 3–25 | BALANCE | 3–6 | 3–6 | 5–15 | BALANCE |
| Apples | 1–10 | 1–10 | 3–25 | BALANCE | 2–8 | 1–4 | 5–15 | BALANCE |
| Pears | 0–8 | 2–8 | 3–25 | BALANCE | 1–3 | 1–3 | 5–15 | BALANCE |
| Apricots | 1–8 | 2–8 | 3–25 | BALANCE | 2–5 | 2–5 | 5–15 | BALANCE |
| Cherries | 3–20 | 2–15 | 3–25 | BALANCE | 5–15 | 3–10 | 5–15 | BALANCE |
| Cabbage | 1–10 | 2–10 | 3–25 | BALANCE | 3–6 | 3–6 | 5–15 | BALANCE |
| Avocado | 3–15 | 2–10 | 3–25 | BALANCE | 5–10 | 3–6 | 5–15 | BALANCE |
| Lettuce | 0–5 | 2–15 | 3–25 | BALANCE | 0–3 | 5–10 | 5–15 | BALANCE |
| Potato | 5–20 | 3–10 | 3–25 | BALANCE | 5–10 | 4–8 | 5–15 | BALANCE |
| Onion | 4–15 | 1–7 | 3–25 | BALANCE | 5–10 | 2–5 | 5–15 | BALANCE |
| Sweet Potato | 3–5 | 5–7 | 3–25 | BALANCE | 2–7 | 4–8 | 5–15 | BALANCE |

Not all concentrations of these gases are effective or equally effective on each and every kind and variety of fruit and vegetable. At certain temperatures and with certain mixtures of gases, physiological or pathogical damage to certain fruits and vegetables may occur, even though fungi growth is inhibited. Such conditions may readily be determined and then avoided.

The following examples illustrate further the scope and content of this invention. In the examples, all percentages are percentages by volume unless the contrary is expressly stated.

DESCRIPTION OF THE WORKING EXAMPLES

Example 1: Cauliflower Storage

A pallet was stacked with ten corrugated fiberboard boxes of cauliflower with 16 heads per box, and then stored in a sealed container having its internal temperature maintained at approximately 40° F. The container was charged with an artificial atmosphere consisting of approximately 2.2% carbon dioxide, 1.8% oxygen, 6.0% carbon monoxide and the remainder gaseous nitrogen. The cauliflower was kept in this special atmosphere and at the stated temperature for a period of six days, at the end of which time the boxes were opened and the cauliflower removed.

On examination, the cauliflower at the end of the test period was found to contain some yellow patches indicating discoloration to curd and/or jacket leaves, which averaged one cauliflower head per carton. Some riciness was evident, averaging about one head every other carton. No heads were found to be undersized and the overall appearance was satisfactory.

Thirty other boxes of cauliflower were stacked, as a control, in a similar manner on a pallet and maintained at 40° F. in atmospheric oxygen for the same period of time as the above test cartons of cauliflower. At the conclusion of the storage, the control cauliflower was found to exhibit yellow discoloration ranging from patches to entire heads, which averaged three to four heads per box. Riciness averaged two heads per box and substantial bacterial soft rot was found on an average of one head every other box. Overall appearance was at best borderline for commercial acceptability because of the riciness and yellow discoloration.

Example 2: Cauliflower Storage

Thirty six corrugated cardboard boxes having twelve cauliflower heads per box were sealed in four and five mil plastic bags, each bag containing 10 pounds of lime. After sealing, the bags were flushed with carbon monoxide gas until there was a residual of about 15% remaining. Carbon dioxide was then added until it formed approximately 10% of the composition which left 12%-13% oxygen, about 15% carbon monoxide and the rest nitrogen.

On conclusion of the test, the four mil bags had maintained the carbon dioxide at about 5%, oxygen at 5% and no carbon monoxide was detectable after six days. In the five mil bags, the levels of oxygen soon became very low. A further 10 pound quantity of lime was added after four days to reduce the carbon dioxide level. Carbon monoxide concentration was about 9% after 7 days.

After a total of seven days holding period, only slight differences could be detected in the bagged cauliflower having the indicated artificial atmosphere over eight similarly packed boxes of cauliflower in a control atmosphere of normal atmospheric air. The curd was more compact in modified atmospheres and the green leaf tissue had a slightly better color. No significant floret mold developed in any of the bags.

All of the bag samples were then broken open and allowed to remain in the air for an additional four days with the temperature held at approximately 60° F. Dramatic differences were then detected between those samples of cauliflower which had been maintained in the artifical atmosphere and those in the air control. Specifically, floret mold was significantly more severe in the air control cauliflower and, as well, the leafy tissue was very yellow as compared to a fresh green color of the artificial atmosphere stored cauliflower.

Example 3: Cauliflower Storage

Cauliflower was stored in plastic bags and in sealed barrels at approximately 38° F. for a total of 17 days. modified atmospheres were provided in the various bags and barrels of the following compositions:

|                  | CO      | CO$_2$ | O$_2$ | N$_2$     |
|------------------|---------|--------|-------|-----------|
| Bag 1 & Barrel 1 | 10%-20% | 0%     | 5%    | Remainder |
| Bag 2 & Barrel 2 | 10%-20% | 5%     | 5%    | Remainder |
| Barrel 3         | 0%      | 5%     | 5%    | Remainder |

At the end of 17 days storage, all of the leafy cauliflower parts held in 5% carbon dioxide atmospheres had a fresh green color. Significant yellowing of the green leafy parts was evident in an air control sample and in those stored modified atmospheres without carbon dioxide. All of the cauliflower samples treated with carbon monoxide were free of mold growth on the flower parts. Where carbon monoxide was not used, but with 5% carbon dioxide, mold growth was significant and differed little from air control.

At the conclusion of storage, all of the cauliflower samples were cooked and tasted. No off color or off flavor was detected. It was concluded from this example that floret molding was particularly inhibited by carbon monoxide in the presence of either/or both elevated carbon dioxide and/or reduced oxygen.

Example 4: Bell Pepper Storage

Six boxes of washed and waxed bell peppers were obtained, four boxes of which were placed in barrels, sealed to include a modified atmosphere. The two remaining boxes were located in unsealed barrels exposed to ambient atmosphere. All of the barrels were maintained at 45° F.

Barrel 1 contained an atmosphere of 10%-20% carbon dioxide, 3%-4% oxygen, 10% carbon monoxide and the remainder nitrogen. Barrel 2 had the same composition of modified atmosphere as barrel 1, except that it had no carbon monoxide component. Barrel 3 was provided with modified atmosphere of 2%-4% carbon dioxide, 5%-7% oxygen, 10% carbon monoxide, and the remainder nitrogen. Barrel 4 had the same modified atmosphere as barrel 3 except that there was no carbon monoxide present.

After twelve days of storage under the prescribed conditions and with the prescribed atmospheres, the peppers in barrel 3 had a field fresh appearance with no indication of surface mold, and only two individual peppers showed any indication of soft rot. The peppers in barrel 4 did show surface mold and seventeen indicated soft rot, with their general appearance all being diminished somewhat by the presence of black stem ends. Similarly, the air control samples had a relatively high number with soft rot, surface mold was substantially in evidence and most had black stem ends.

After a total of sixteen days of storage, the peppers in barrel 1 were again examined and found to have a field fresh appearance with no surface mold present at all, although two peppers did show evidence of soft rot. Barrel 2 had three peppers with soft rot, substantial surface mold was present, and an off flavor condition. The air control samples included 13 and 17 peppers, respectively, with soft rot, surface mold was clearly in evidence and many had black stem ends.

It is concluded from this example that carbon monoxide enhanced the appearance of the peppers and inhibited fungus growth.

Example 5: Mushroom Storage

Four open boxes of mushrooms were placed in three different barrels and sealed with the following modified atmospheres:

|  | CO | $CO_2$ | $O_2$ | $N_2$ |
|---|---|---|---|---|
| Barrel 1 | 20% | 5% | 3% | Remainder |
| Barrel 2 | 10% | 10% |  | Remainder |
| Barrel 3 | 10% | 15% | 20% | Remainder |

In addition, four boxes were maintained in atmospheric air as a control.

None of the mushrooms experienced any marked weight loss during the test, either those in the control air storage or in the modified atmospheres, with overall weight loss being only about 1% more in air storage than in the modified atmospheres.

At the end of 14 days of storage, with the temperature maintained throughout at approximately 33°–34° F. for all samples, the mushrooms in barrel 1 were only slightly better in appearance than the air control mushrooms. It is concluded from this that a significant oxygen level should be maintained for successful mushroom storage.

The mushrooms in barrel 2 at the conclusion of the 14 day test had a good external appearance with some slight internal discoloration of the cap and stem tissue, which was concluded to be a result of growing conditions rather than produced during storage.

Barrel 3 had the best overall external and internal appearance at the conclusion of the test. The mushrooms had a fresh smell, only very slight external discoloration and no internal discoloration of the cap tissue. The stem tissue did have some discoloration resulting from growing conditions.

Example 6: Mushroom Storage

Mushrooms from a different source than those used in Example 5 were stored at 33°–34° F. in two separate sealed containers. The first contained a modified gaseous environment of 20% carbon monoxide, 20% oxygen, less than 1% carbon dioxide and the remainder nitrogen. The atmosphere in the second barrel consisted of 15% carbon monoxide, 20% oxygen, 12% carbon dioxide and the remainder nitrogen. A separate environmental air control barrel was also provided.

After 14 days of storage, the mushrooms in the first barrel had a good external appearance, with some internal discoloration equal to that experienced in the air control.

Those mushrooms stored in barrel 2 were in nearly perfect condition after the storage of 14 days. Almost no internal discoloration could be found in either the caps or the stems.

Example 7: Grape Storage

A quantity of Emperor grapes in open boxes and previously treated with sulphur dioxide gas were stored in the following respective modified atmospheres with the temperature maintained at 33°–34° F.:

|  | CO | $CO_2$ | $O_2$ | $N_2$ |
|---|---|---|---|---|
| Container 1 | 5% | 0%–1% | 5% | Remainder |
| Container 2 |  | 0%–1% | 5% | Remainder |
| Container 3 | 10% | 5% | 5% | Remainder |
| Container 4 |  | 5% | 5% | Remainder |
| Container 5 |  | 10% | 5% | Remainder |

In addition, two boxes of grapes were maintained in air storage as a control. All of the grapes, whether in the air storage or the modified atmosphere were stored for ninety-seven (97) days.

At the conclusion of the storage, those grapes held in modified atmospheres including carbon monoxide (containers 1 and 3) were completely free of any mold growth. In addition, these grapes were firm, the taste was normal and the bloom was good. Stem and pedical tissue was greener in those atmospheres having a lower percentage of carbon dioxide (containers 1 and 2).

Grapes stored in container 2 had the freshest appearing stem and pedicel tissue, although there was some accompanying mold growth. Berry firmness, bloom and taste were good.

The condition of container 4 grapes was comparable to that of container 3, except that the stem and pedicel tissue was browner and more shriveled.

Grapes from container 5 had an off-flavor and stem tissue was very brown and shriveled. No mold growth was evident.

The air control grapes experienced severe mold growth and, also, the stems and pedicels were markedly shriveled and brown.

Example 8: Blueberry Storage

Individual pint containers of blueberries of the "Wolcott" variety were placed in separate desiccators having ten (10) different modified atmospheres at 38°–40° F. for sixteen (16) days, after which they were removed and examined. The atmospheres used and the results obtained are shown in the following table:

| TREATMENT | % GOOD | % RUNNY SOFT | % MOLDY | % BAD |
|---|---|---|---|---|
| Air Control Sample 1 | 89.0 | 6.7 | 4.3 | 11.0 |
| Air Control Sample 2 | 81.6 | 13.3 | 5.1 | 18.4 |
| 1. 5% $CO_2$, 10% $O_2$ | 91.2 | 7.1 | 1.7 | 8.8 |
| 2. 5% $CO_2$, 10% $O_2$, 15%–25% CO | 96.8 | 2.9 | 0.3 | 3.2 |
| 3. 5% $CO_2$, 3% $O_2$ | 91.6 | 7.1 | 1.3 | 8.4 |
| 4. 5% $CO_2$, 3% $O_2$, 8%–25% CO | 97.1 | 2.6 | 0.3 | 2.9 |
| 5. 0% $CO_2$, 5% $O_2$ | 89.5 | 8.0 | 2.5 | 10.5 |
| 6. 0% $CO_2$, 5% $O_2$, 10%–20% CO | 95.7 | 4.0 | 0.3 | 4.3 |

-continued

| TREATMENT | % GOOD | % RUNNY SOFT | % MOLDY | % BAD |
| --- | --- | --- | --- | --- |
| 7. 10% $CO_2$, 10% $O_2$ | 93.1 | 6.3 | 0.6 | 6.9 |
| 8. 10% $CO_2$, 10% $O_2$, 10%–18% CO | 95.7 | 3.0 | 1.3 | 4.3 |
| 9. 10% $CO_2$, 3% $O_2$ | 96.3 | 3.7 | 0 | 3.7 |
| 10. 10% $CO_2$, 3% $O_2$, 18%–25% CO | 97.7 | 2.3 | 0 | 2.3 |

Except for the No. 5 atmosphere, all the berries were better than the air control samples. The addition of carbon monoxide gave improved results in all cases. Shelf-life remained good through three (3) days at ambient temperature with no off-flavor, grittiness or other defects detected.

Example 9: Avocado Storage

Two groups of 24 avocados each were placed in separate containers. The atmosphere in the first container was modified to contain initially a preservative atmosphere including about 10% carbon dioxide, about 8% carbon monoxide, about 3% oxygen, the balance all substantially molecular nitrogen. The atmosphere in the second container was air. The temperature inside each container was modified to and maintained at 55° F. for 16 days. During this time, the atmosphere in the first container was monitored, and adjustments were made to maintain the gas concentration close to the starting concentration.

At the end of the storage period, avocados held in the second container were soft, ripe and had slight mold growth on their stem buttons. Avocados held in the first container were hard, green and free of mold growth. After three observations were made, the avocados from the first container were held in air at about 70°–75° F. for one day, and then at 45° F. in air for another day. Avocados that had been held in the first container were slightly soft. About half were still green; the other half were purple-brown in color, indicative of partial ripening.

Neither the avocados held in air nor the avocados held in preservative atmosphere developed any chilling symptoms or decay. This example shows that carbon monoxide is an effective fungistat on avocados when used in combination with carbon dioxide and oxygen.

Example 10: Cabbage Storage

Two groups of cabbage heads, each including twelve heads, were placed in separate containers. The atmosphere in the first container was modified to contain initially about 5% carbon dioxide, about 5% carbon monoxide, and about 5% oxygen. The atmosphere in the second container was air throughout the test. The temperature within each container was modified to and maintained at 42° F. for three weeks. During this time, the atmosphere in the first container was monitored, and adjustments were made to maintain the gas concentrations close to the starting concentrations.

At the end of this period, the cabbages held in air had turned substantially completely yellow, and mold growth was visible on the wrapper leaves. Cabbages held in the preservative atmosphere were in good condition. The leaves had not yellowed and little mold growth was visible.

The improvement that carbon monoxide produced was particularly striking because the quality of the cabbage at the outset of the test was poor; cabbages then had severe leaf spotting on both wrapper and cap leaves.

Example 11: Eggplant Storage

Five groups of 18 eggplants each were placed in separate containers. In four of the containers, the atmosphere was modified to contain initially the following:

Container 1: About 1%–3% carbon dioxide, about 5% oxygen, about 10% carbon monoxide, and the balance substantially all molecular nitrogen.

Container 2: About 7% carbon dioxide, about 5% oxygen, about 10% carbon monoxide, and the balance substantially all molecular nitrogen.

Container 3: About 1%–3% carbon dioxide, about 5% oxygen, and the balance substantially all molecular nitrogen.

Container 4: About 7% carbon dioxide, about 5% oxygen, and the balance substantially all molecular nitrogen.

The atmosphere in container 5 was air throughout the test. The temperature in each of the containers was adjusted to and maintained at 45° F. for two weeks. During this time, the atmospheres in the first four containers were monitored and adjustments were made to maintain the gas concentrations close to the starting concentrations.

After the two week period, the eggplant held in air had poor color, severely molded calyxes, and some pitted surfaces, indicating that Alternaria rot had begun to develop.

By contrast, eggplant held in containers 1 and 2 retained good green color in the calyxes, had little or no decay, and retained a fresh appearance. Eggplant held in container 1 appeared slightly better than the eggplant held in container 2.

Eggplant held in containers 3 and 4 were in poor condition. Calyxes on these eggplant had as much mold as eggplant held in air, and some scalding of eggplant surfaces had also occurred.

Example 12: Lettuce Storage

Three groups of iceberg lettuce, each containing 24 heads, were placed in separate containers. The atmosphere in the first container was modified to contain initially about 10% oxygen, about 9% carbon monoxide, and the balance substantially all molecular nitrogen. The atmosphere in the second was modified to contain initially about 10% oxygen, about 15% carbon monoxide, and the balance substantially all molecular nitrogen. The atmosphere in the third contained air throughout the test. The temperature in each container was maintained at about 34° F. for 19 days. During the test, the atmosphere in containers 1 and 2 was monitored, and adjustments was made to maintain the gas concentrations close to the starting concentrations.

At the end of the 19-day period, half of the heads were moved and inspected immediately, and the other half were held at about 70°–75° F. in air for two days and then inspected. The results were as follows:

After 19 days, three of the 12 heads held in air exhibited Botrytis rot; none of the 24 lettuce heads held in the carbon monoxide-containing atmospheres showed any. Forty-eight hours later, nine of the 12 lettuce heads held in air exhibited Botrytis rot; none of the remaining lettuce heads held in the carbon monoxide containing-atmospheres exhibited any such rot. These results show that carbon monoxide effectively controls fungi growth that otherwise causes severe damage to lettuce.

Example 13: Lettuce Storage

Two groups of iceberg lettuce, each containing 60 heads, were placed in separate containers. The atmosphere in the first container was modified to produce an atmosphere initially containing about 8% oxygen, about 20% carbon monoxide, and the balance substantially all molecular nitrogen. The second container held air throughout the test. The temperature in each container was lowered to and maintained at about 33°-34° F. for two weeks. During that time, the atmosphere in the first container varied from about 20% carbon monoxide to about 7%, and the oxygen, from about 8% to about 10%.

At the end of the two week period, none of the lettuce held in the first container exhibited Botrytis, but two of the lettuce heads held in air did. Moreover, only 12 of the heads held in the first container exhibited developing soft rot; 22 from the air control did. Severity of decay was considerably lower for lettuce heads treated with carbon monoxide than for lettuce heads held in air without carbon monoxide. Again, carbon monoxide appeared to inhibit substantially the growth of Botrytis fungi and bacterial soft rot on lettuce.

Example 14 Honeydew Melon Storage

Five groups of five honeydew melons each were placed in separate containers. The atmosphere in four of the containers was modified; the atmosphere in the fifth was air throughout the test. The modified atmospheres were as follows:

Container 1: Zero to about 2% carbon dioxide, about 5% oxygen, about 10%-15% carbon monoxide, and the balance substantially all molecular nitrogen.

Container 2: About 5% carbon dioxide, about 5% oxygen, about 10%-15% carbon monoxide, and the balance substantially all molecular nitrogen.

Container 3: About 10% carbon dioxide, about 5% oxygen, about 10%-15% carbon monoxide, and the balance substantially all molecular nitrogen.

Container 4: About 15% carbon dioxide, about 5% oxygen, about 10%-15% carbon monoxide, and the balance substantially all molecular nitrogen.

The atmosphere in each container maintained at about 50° F. for three weeks. During this time, the atmosphere in each of the first four containers was monitored, and adjustments were made to maintain the gas concentration close to the starting concentrations.

The containers were opened after the three week period, and the melons inspected. Those in the modified atmosphere treatment were free from rot and mold growth. Three of the five melons from the air control exhibited decay, mold growth or both.

After holding the melons from each of the containers at about 70°-75° F. in air for four days, four of the five melons held exhibited decay, but none of the melons held in modified atmosphere did. No rind blemishes developed in melons held in modified atmospheres, and the taste and aroma of all melons, including those held in air, was normal.

Example 15 Cantaloupe Storage

Six groups of 16 cantaloupes each were placed in separate containers. The atmospheres in five of the containers were modified to contain the following:

Container 1: Zero-about 2% carbon dioxide, about 5% oxygen, about 10%-15% carbon monoxide, and the balance substantially all molecular nitrogen.

Container 2: About 5% carbon dioxide, about 5% oxygen, about 10%-15% carbon monoxide, and the balance substantially all molecular nitrogen.

Container 3: About 10% carbon dioxide, about 5% oxygen, about 10%-15% carbon monoxide, and the balance substantially all molecular nitrogen.

Container 4: About 15% carbon dioxide, about 5% oxygen, about 10%-15% carbon monoxide, and the balance substantially all molecular nitrogen.

Container 5: About 0-5% carbon dioxide, about 21%-4% oxygen, about 10%-15% carbon monoxide, and the balance substantially all molecular nitrogen.

The sixth container held air throughout the test. The temperature in each container was lowered to and maintained at about 50° F. for three weeks. During the three weeks, the gas concentrations in containers 1 through 5 were monitored, and adjustments were made to maintain the gas concentrations close to the starting concentrations. However, in container 5, the oxygen concentration was permitted to decrease from 21% at the outset to 4% at the end of the three week period.

At the end of the three weeks, the containers were opened and the cantaloupes examined. All melons exhibited some mold and decay, but the carbon monoxide-treated melons exhibited substantially less decay than cantaloupes held in air. Higher concentrations of carbon dioxide in combination with carbon monoxide enhanced inhibition of the fungi.

Example 16 Nectarine Storage

Four groups of nectarines, each containing from 25 to 30 fruit, were placed in separate containers. The atmosphere in three of the containers was modified to contain initially the following concentrations of gases:

Container 1: About 12% carbon dioxide, about 3% oxygen, and the balance substantially all molecular nitrogen.

Container 2: About 12% carbon monoxide, about 10% oxygen, and the balance substantially all molecular nitrogen.

Container 3: About 7% carbon dioxide, about 7% oxygen, about 10% carbon monoxide, and the balance substantially all molecular nitrogen.

The fourth container held air throughout the test. The temperature of each container was lowered to 32° F. initially, but rose to 50° F. for at least part of the test period. During the three week period, the gas concentrations in each of the first three containers were monitored and adjustments were made to maintain the concentrations at or near the starting concentration.

After three weeks, the containers were opened and the fruit inspected. Of the 28 fruit in container 1, 8 exhibited some brown rot and some off-flavor. Of the 25 fruit in container 2, none exhibited brown rot, but some were off-flavor. Of the 25 fruit in container 3, none exhibited brown rot, and flavor was acceptable. Of the 31 fruit held in air, 12 exhibited brown rot, and again flavor was acceptable.

Carbon monoxide inhibited development of brown rot fungi without any detrimental impact on flavor.

Moreover, where carbon monoxide was present, carbon dioxide could be maintained at lower levels, insuring preservation of good flavor.

Example 17 Papaya Storage

Two groups of papaya, one containing 14 fruit, the other, 16 fruit, were placed in separate containers. The atmosphere in the first container was modified to contain initially an atmosphere of about 10% carbon dioxide, about 3% oxygen, about 10% carbon monoxide, and the balance substantially all molecular nitrogen. The atmosphere in the second container was air throughout the test. The temperature in each container was modified to, and held at 55° F. for 10 days. During the 10 days, the atmosphere in the first container was monitored, and adjustments made to maintain gas concentrations at or near the initial concentrations.

At the end of 10 days, papayas held in air were riper than those held in the modified atmosphere. All fruit was held another four days at about 70°-75° F. in air to observe ripening and shelf life. At the end of four days, fruit held in modified atmosphere was still not nearly as ripe as the fruit held in air throughout.

None of the fruit developed any Anthracnose rot, but 4 of the 16 fruit held in air developed stem end rot. Only 1 of the fruit held in the modified atmosphere exhibited any stem end rot. Taste and aroma of all fruit was normal, indicating that carbon monoxide had no deleterious effect on flavor.

Example 18 Peach Storage

Three groups of peaches of the Summerset variety, 100 fruit in each group, were placed in separate containers. The atmosphere in the first container was modified to contain initially about 3% carbon dioxide, about 4% oxygen, about 10% carbon monoxide, and the balance substantially all molecular nitrogen. The atmosphere in the second container was modified to contain about 5% carbon dioxide, about 5% oxygen, about 10% carbon monoxide, and the balance substantially all molecular nitrogen. The third container held air throughout the test. The temperature in each container was reduced to and held at about 32° F. for five weeks. During this time, the gas concentrations in the first two containers were monitored, and adjustments were made to maintain the gas concentrations at or near the starting concentrations.

At the end of three weeks, the containers were opened, and 50 peaches were removed from each of the containers. Of the 50 peaches removed from the air container, 8 were decayed at mechanically damaged areas. Advancement of decay was moderate, and mycelial growth was abundant. Of the 50 peaches from container 2, 5 were decayed at mechanically damaged areas, but decay was much less advanced than with peaches held in air, and both mycelial growth and sporulation were inhibited. Of the 50 peaches held in container 1, 3 were decayed at mechanically damaged areas, but again, mycelial growth and sporulation were inhibited.

The rest of the peaches were held two more weeks in the containers under the same conditions. Of the 100 peaches from the two modified atmosphere containers, only 13 in all (6 from container 1 and 7 from container 2) were decayed at mechanically damaged areas. Of the 50 peaches from the air control atmosphere, 22 were decayed in mechanically damaged areas. No mycelial growth or sporulation was evident on peaches held in modified atmospheres, but such growth and sporulation was profuse on peaches held in air. Moreover, peaches held in modified atmosphere containing the higher concentration of carbon dioxide had the best texture and taste of the three groups. Peaches held in the lower concentration of carbon dioxide and the peaches held in air were drier and much less tasty.

Example 19 Bell Pepper Storage

Four groups of about 100 bell peppers each were placed in separate containers. In the first container, the atmosphere were modified to produce an atmosphere containing initially about 3% carbon dioxide, about 5% oxygen, about 25% carbon monoxide, and the balance substantially all molecular nitrogen. In the second container, the atmosphere was air throughout the test. The temperature in each container was reduced to and held at about 48° to about 50° F. for 23 days. During this time, the oxygen concentration varied from about 5% to about 10%, and the carbon monoxide concentration from about 25% to about 10% in the first container.

At the end of 23 days, the peppers were removed and observed. Peppers held in air had mold growth on all stems, and many exhibited severe rotting. Peppers held in the modified atmosphere were free of surface mold growth and rots.

In a separate test, a third group of peppers was placed in a third container, and the atmosphere therein modified to contain initially about 2% carbon dioxide, about 5% oxygen, about 15% carbon monoxide, and the balance substantially all molecular nitrogen. The atmosphere in the fourth container, into which was placed the fourth group of bell peppers, was air throughout this second test. The temperature in the third and fourth containers was reduced to and maintained at about 48° to about 50° F. throughout a 14 day test period. Thereafter, the peppers were removed and observed, and results were comparable to those obtained with the peppers held in containers 1 and 2 for 23 days.

Example 20 Zucchini Squash Storage

Six groups of Zucchini squash, each group containing about 110 to about 120 squash, were placed in separate containers. The atmospheres in 5 of the containers were modified to produce the following compositions:

Container 1: About 10% carbon dioxide, about 3% to about 5% oxygen, and the balance substantially all molecular nitrogen.

Container 2: About 10% carbon dioxide, about 3% to about 5% oxygen, about 10% carbon monoxide, and the balance substantially all molecular nitrogen.

Container 3: About 5% carbon dioxide, about 3% to about 5% oxygen, and the balance substantially all molecular nitrogen.

Container 4: About 5% carbon dioxide, about 3% to about 5% oxygen, about 10% carbon monoxide, and the balance substantially all molecular nitrogen.

Container 5: About 20% oxygen, about 10% carbon monoxide, and the balance substantially all molecular nitrogen.

The sixth container held air throughout the test. The temperature in each of the containers was reduced to and maintained at about 45° F. to 47° F. for two weeks. During this time, the atmospheres in containers 1 through 4 were monitored, and adjustments made to hold the concentrations at or near the starting concentrations. However, in the fifth container, the oxygen concentration was permitted to decrease naturally by respiration to about 3% at the end of the test period.

At the end of two weeks, the squash were removed and inspected. The squash held in air had surface mold growth on virtually the entire surface of all the squash. Ten squash held in air exhibited some decay. Squash held in container 1 had a small quantity of surface mold growth; 7 squash were slightly decayed. Squash held in container 2 had no decay and only traces of surface mold growth. Squash held in container 3 had the most surface mold growth and the highest number of decayed squash. The squash from container 4 were not decayed and exhibited only traces of surface mold growth. Squash held in container 5 had little decay but exhibited substantial mold growth, indicating that carbon dioxide also has a valuable role in preserving the life of this vegetable.

Example 21 Tomato Storage

Three groups of 48 tomatoes each were placed in separate containers. The atmospheres in the first two containers were modified to produce the following:

Container 1: About 3% to about 5% oxygen, about 5% to about 10% carbon monoxide, and the balance substantially all molecular nitrogen.

Container 2: About 3% to about 5% oxygen, and the balance substantially all molecular nitrogen.

The third container held air throughout the test. The temperature in each container was reduced to and held at about 50° F. for 23 days. During this time, the concentrations of gases in containers 1 and 2 were monitored, and adjustments made to maintain the concentrations at or near the starting concentrations.

At the end of 23 days, the tomatoes held in container 1 were free from rot. Tomatoes from containers 2 and 3 were severely rotted. This test proves that carbon monoxide effectively inhibits the growth of fungi on tomatoes.

Example 22 Tomato Storage

Two groups of 72 tomatoes each were placed in separate containers. Half of each group had a color index of 2–3; the other half, 4–5. Atmosphere in container 1 was modified to contain initially about 5% oxygen, about 14% carbon monoxide, and the balance substantially all molecular nitrogen. The atmosphere in container 2 was air throughout the test. The temperature in each container was modified to and held at about 50° F. for two weeks. During that time, the gas concentrations in container 1 were monitored and adjustments made to maintain the concentrations at or near the starting concentrations.

At the end of two weeks, the tomatoes held in air had all advanced to a color index of 5. Those initially of index 4–5 were 40% decayed and surface mold growth was present on all stem scars. Those initially of color index 2–3 were about 20% decayed, and surface mold growth was present on about 50% of the stem scars.

Those tomatoes held in modified atmosphere that initially had the color index 4–5 advanced to color index 5 almost entirely, and were free of surface mold growth and decay. Those tomatoes held in modified atmosphere that had an initial color index of 2–3 were still substantially all at index 2–3, and were also free of surface mold growth and decay.

Example 23 Thompson Seedless Grape Storage

Four boxes of Thompson seedless grapes, each box containing about 20 pounds of grapes, were placed in separate containers. These grapes had been previously treated with sulfur dioxide in order to control decay. The atmospheres in the first three containers were modified to produce atmospheres initially having the following compositions:

Container 1: About 10% carbon dioxide, about 5% to about 10% oxygen, about 10% to about 20% carbon monoxide, and the balance substantially all molecular nitrogen.

Container 2: About 5% carbon dioxide, about 5% to about 10% oxygen, about 10% to about 20% carbon monoxide, and the balance substantially all molecular nitrogen.

Container 3: About 5% to about 10% oxygen, about 10% to about 20% carbon monoxide, and the balance substantially all molecular nitrogen.

The atmosphere in the fourth container was air throughout the test. The temperature in each of the containers was modified to, and held at about 33° to about 34° F. for 11 weeks. During this time, the gas concentrations in the first three containers were monitored, and adjustments made to maintain the concentrations of each of the gases at or near the initial concentrations. After four weeks, mold was evident in air control grapes. After seven weeks of storage, the air control grapes were a solid mass of nesting mold. All grapes held in modified atmospheres were free of rots and mycelial growth at the end of the 11-week period. These results were particularly striking because the ideal storage temperature for grapes is about 30° to about 31° F.

Example 24 Grape Storage

Grapes of two varieties, namely Cabernet Sauvignon and Johannesberg Reisling, each variety including some grapes of grade one (rot free) and grade two (Alternaria field rot infected) were divided as follows for testing. Approximately one pound of grade one grapes from each variety was placed in a first container, and approximately one pound of grade two grapes of each variety was placed in a second container. Approximately the same quantities and combinations were placed in third and fourth containers to serve as controls.

The atmosphere in the first container was modified to produce a composition including about 5% to about 12% oxygen, about 15% to about 20% carbon monoxide, and the balance substantially all molecular nitrogen. The atmosphere in the second container was modified to produce a composition including about 2% to about 5% oxygen, about 20% to about 25% carbon monoxide, and the balance substantially all molecular nitrogen. The second container also included amounts of carbon dioxide that did not exceed about 1% at any time during the test. The atmosphere in the third and fourth containers was air throughout the test. The temperature in each of the containers was modified to and maintained at about 34° to about 35° F. for a 45-day period. During that time, the carbon monoxide and oxygen concentrations in the first two containers fluctuated between the values set forth above, and adjustments were made to maintain these values within these ranges throughout the test period.

At the end of 45 days, the grade 1 grapes from container 1 were free of mold growth. The Alternaria field rot infections on the grade 2 grapes from container 2 had not advanced, indicating that the rot infections were inhibited. By contrast, the grade 2 grapes from the air control container 4 were grossly rotted and mycelial growth was abundant. Mold growth on grade 1 grapes from container 3 was also objectionable though not as severe as that on grade 2 grapes from container 4.

What is claimed is:

1. A process for inhibiting the growth of fungi on fresh fruits and fresh vegetables other than leafy and head vegetables comprising maintaining said fresh fruits and fresh vegetables in a modified gaseous atmosphere, including carbon dioxide in an amount from zero to about 20% by volume, molecular oxygen in an amount of about 1% to about 20% by volume, carbon monoxide in an amount of about 3% to about 25% by volume, with the remainder being substantially all molecular nitrogen, at a temperature in the range of about 29° F. to about 60° F. for a time sufficient to inhibit growth of fungi on said fresh fruits and fresh vegetables.

2. The process of claim 1 wherein the vegetables are bell peppers, the carbon dioxide concentration is in the range of about 1% to about 10%, and the oxygen concentration is in the range of about 5% to about 20%.

3. The process of claim 1 wherein the vegetables are mushrooms, the carbon dioxide concentration is in the range of about 3% to about 20%, and the oxygen concentration is in the range of about 3% to about 20%.

4. The process of claim 1 wherein the fruit are grapes, the carbon dioxide concentration is in the range of zero to about 15%, and the oxygen concentration is in the range of about 2% to about 15%.

5. The process of claim 1 wherein the fruit are blueberries, the carbon dioxide concentration is in the range of about 1% to about 15%, and the oxygen concentration is in the range of about 2% to about 10%.

6. The process of claim 1 wherein the vegetables are tomatoes, the carbon dioxide concentration is in the range of about zero to about 7%, and the oxygen concentration is in the range of about 3% to about 10%.

7. The process of claim 1 wherein the vegetables are squash, the carbon dioxide concentration is in the range of about 3% to about 15%, and the oxygen concentration is in the range of about 2% to about 10%.

8. The process of claim 1 wherein the fruit are pineapples, the carbon dioxide concentration is in the range of about 1% to about 15%, and the oxygen concentration is in the range of about 2% to about 15%.

9. The process of claim 1 wherein the fruit are peaches, the carbon dioxide concentration is in the range of about 1% to about 10%, and the oxygen concentration is in the range of about 2% to about 10%.

10. The process of claim 1 wherein the fruit are papayas, the carbon dioxide concentration is in the range of about 2% to about 10%, and the oxygen concentration is in the range of about 2% to about 10%.

11. The process of claim 1 wherein the fruit are nectarines, the carbon dioxide concentration is in the range of about 1% to about 10%, and the oxygen concentration is in the range of about 2% to about 10%.

12. The process of claim 1 wherein the fruit are mangoes, the carbon dioxide concentration is in the range of about 2% to about 10%, and the oxygen concentration is in the range of about 2% to about 10%.

13. The process of claim 1 wherein the fruit are melons, the carbon dioxide concentration is the range of about 2% to about 20%, and the oxygen concentration is in the range of about 3% to about 15%.

14. The process of claim 1 wherein the vegetables are eggplants, the carbon dioxide concentration is in the range of zero to about 8%, and the oxygen concentration is in the range of about 2% to about 15%.

15. The process of claim 1 wherein the vegetables are green beans, the carbon dioxide concentration is in the range of about 2% to about 10%, and the oxygen concentration is in the range of about 2% to about 10%.

16. The process of claim 1 wherein the fruit are apples, the carbon dioxide concentration is in the range of about 1% to about 10%, and the oxygen concentration is in the range of about 1% to about 10%.

17. The process of claim 1 wherein the fruit are pears, the carbon dioxide concentration is in the range of zero to about 8%, and the oxygen concentration is in the range of about 2% to about 8%.

18. The process of claim 1 wherein the fruit are apricots, the carbon dioxide concentration is in the range of about 1% to about 8%, and the oxygen concentration is in the range of about 2% to about 8%.

19. The process of claim 1 wherein the fruit are cherries, the carbon dioxide concentration is in the range of about 3% to about 20%, and the oxygen concentration is in the range of about 2% to about 15%.

20. The process of claim 1 wherein the fruit are avocadoes, the carbon dioxide concentration is in the range of about 3% to about 15%, and the oxygen concentration is in the range of about 2% to about 10%.

21. The process of claim 1 wherein the vegetables are potatoes, the carbon dioxide concentration is in the range of about 5% to about 20%, the oxygen concentration is in the range of about 3% to about 10%.

22. The process of claim 1 wherein the vegetables are onions, the carbon dioxide concentration is in the range of about 4% to about 15%, and the oxygen concentration is in the range of about 1% to about 7%.

23. The process of claim 1 wherein the vegetables are sweet potatoes, the carbon dioxide concentration is in the range of about 3% to about 5%, and the oxygen concentration is in the range of about 5% to about 7%.

* * * * *